United States Patent
Todd (10) Patent No.: US 7,487,550 B2
(45) Date of Patent: Feb. 3, 2009

(54) METHODS, APPARATUS AND COMPUTER PROGRAMS FOR PROCESSING ALERTS AND AUDITING IN A PUBLISH/SUBSCRIBE SYSTEM

(75) Inventor: Stephen James Todd, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 826 days.

(21) Appl. No.: 10/531,850

(22) PCT Filed: Jul. 30, 2003

(86) PCT No.: PCT/GB03/03222

§ 371 (c)(1),
(2), (4) Date: Apr. 19, 2005

(87) PCT Pub. No.: WO2004/053752

PCT Pub. Date: Jun. 24, 2004

(65) Prior Publication Data

US 2006/0056628 A1    Mar. 16, 2006

(30) Foreign Application Priority Data

Dec. 12, 2002   (GB)   .................................. 0228941.1

(51) Int. Cl.
*G06F 17/30* (2006.01)
*H04L 9/32* (2006.01)

(52) U.S. Cl. ........................... 726/27; 707/10; 370/428; 709/238; 726/26; 726/28; 726/29

(58) Field of Classification Search ........................ None
See application file for complete search history.

(56) References Cited

U.S. PATENT DOCUMENTS 6,044,372 A * 3/2000 Rothfus et al. ................. 707/10
6,158,007 A * 12/2000 Moreh et al. ................... 726/1

(Continued)

FOREIGN PATENT DOCUMENTS

EP    A-0 961 452    12/1999

OTHER PUBLICATIONS

"Design of a General Clinical Notification System Based on the Publish-Subscribe Paradigm", A conference of the American Medical Informatics Association. By, A. Geissbuhler, M.D., W. W. Stead, M.D., Oct. 25, 1997, pp. 126-130, XP002179981.

(Continued)

*Primary Examiner*—Jung Kim
(74) *Attorney, Agent, or Firm*—A. Bruce Clay, Esq.; Steven M. Greenberg, Esq.; Carey Rodriguez Greenberg & Paul LLP (57) ABSTRACT

A message broker receives a published message from a publisher program. Responsive to identification of one or more subscriber programs subscribing to messages of the type of the received message, the broker forwards the received message to the one or more subscriber programs. Matcher components compares the received message with stored subscriptions to identify subscriber programs, generates an alert when an alert condition is satisfied, and compares the generated alert with stored subscriptions to identify subscriber programs subscribing to the alert. The alert is then forwarded to the subscriber program subscribing to the alert.

1 Claim, 7 Drawing Sheets

| ALERT | MESSAGE ID | SUBSCRIBER ID | TOPIC | SUB_NOT_AUTHORIZED |

U.S. PATENT DOCUMENTS

| | | | |
|---|---|---|---|
| 6,584,459 B1 | 6/2003 | Chang et al. | |
| 6,654,734 B1 | 11/2003 | Mani et al. | |
| 6,980,993 B2 * | 12/2005 | Horvitz et al. | 707/102 |
| 2002/0154010 A1 * | 10/2002 | Tu et al. | 340/517 |

OTHER PUBLICATIONS

"Exploiting an Event-Based Infrastructure to Develop Complex Distributed Systems", Proceedings of the 1998 International Conference in Kyoto, Japan Apr. 19-25, 1998, Los Alamitos, CA, USA, IEEE Comput.Soc, US, Apr. 19, 1998, pp. 261-270. XP010276009.

Icc.net Internet Commerce Corporation on website ICC.net/Services/Infosafe and ICC.net/Services/Infosafe/Technology, 2001.

Arnold et al, "Discourse with Disposable Computers: How and Why You Will Talk to Your Tomatoes", USENIX Proceedings of the Embedded Systems Workshop, Mar. 29-31, 1999.

* cited by examiner

METHODS, APPARATUS AND COMPUTER PROGRAMS FOR PROCESSING ALERTS AND AUDITING IN A PUBLISH/SUBSCRIBE SYSTEM

FIELD OF INVENTION

The present invention relates to communications within a network, and in particular to methods and apparatus for publish/subscribe data communications.

BACKGROUND

Within a message delivery system, messages may be delivered through a network of servers including one or more "brokers" which provide routing and formatting services. The brokers are located at communication hubs within the network.

Many message brokers support the publish/subscribe communication paradigm. This involves a set of one or more publishers sending communications to be received by a set of one or more subscribers who have registered their interest in receiving communications of that type. Publish/subscribe allows subscribing users to receive the very latest information in an area of interest (for example, stock prices or events such as news flashes or store special offers). A typical publish/subscribe environment has a number of publisher applications sending messages via a broker to a number (potentially a very large number) of subscriber applications located on remote computers across the network. In this case, the subscribers notify the broker(s) of the message types they wish to receive and this information is stored at the broker. Publishers send their messages to the broker, which uses a matching engine to compare the message type (for example, checking message header topic fields and/or checking message content) with its stored subscriber information to determine which subscribers the message should be forwarded to. The message broker may perform additional functions, such as filtering, formatting or otherwise processing received messages before forwarding them to subscribers.

A commercially available example of a message broker supporting the publish/subscribe paradigm is IBM Corporation's WebSphere MQ Integrator middleware product family. (IBM and WebSphere are trademarks of International Business Machines Corporation).

Existing publish/subscribe solutions (including IBM's WebSphere MQ Integrator products) provide a security authorization feature that permits publications to be accepted or refused by reference to the specific publisher and topic, and permits their dissemination to be controlled by reference to the set of subscribers authorized to receive messages for that topic. Such authorizations will be set up by an administrator and act in conjunction with the topic subscriptions made by the subscribers themselves.

U.S. Pat. No. 6,158,007 discloses a broker enforcing security policies for different subjects, and an audit service subscribing to a publish/subscribe matching engine to receive messages on specific subjects. The audit service can be thought of as one of the subscribers, since the audit service will receive the original message if the message subject matches a specific list of subjects stored at the broker. A problem with this approach is that the publish/subscribe paradigm normally only allows a subscriber to receive a message which matches its subscription profile, without knowing which other subscribers received the message.

Infosafe from icc.net is a publishing management service which keeps an audit trail for publish/subscribe activity—including a complete audit trail of all product based activity and reports of all upload and download activity by client and product.

David Arnold et al, "Discourse with Disposable Computers: How and Why You Will Talk to Your Tomatoes", USENIX Proceedings of the Embedded Systems Workshop, Mar. 29-31 1999, Cambridge, Mass., USA, describes a prototype message routing program, known as Elvin, which provides content-based routing and security based on authorization keys. Arnold et al recognize the need for charging for publish/subscribe services, but the only solution mentioned is charging based on the number of bytes of data exchanged.

There remains a need in the art for improved publish/subscribe systems, in which features such as auditing, charging and/or security are not limited as in the above-referenced examples.

SUMMARY OF INVENTION

Aspects of the present invention provide methods, data processing systems and computer programs for generating alerts in response to events within a publish/subscribe communications system. The alerts are generated by a matching engine of the publish/subscribe system, and the alerts are then processed by a matching engine within the publish/subscribe system to determine required dissemination of alert information.

Alerts in this context comprise indications of the occurrence of predefined alert conditions. In general, the alert conditions will be specific trigger events such as an attempt by a publisher to publish on an unauthorized topic or other attempts to perform actions blocked by access control lists (ACLs), attempts to access sensitive documents (even if permitted), or all accesses to information for which an audit trail or use-based charging is required. The alerts may drive a charging process.

According to a first aspect of the invention, there is provided a method for processing messages in a publish/subscribe message dissemination system, wherein one or more alert conditions are defined for the system, the method comprising the steps of: receiving a message; comparing the message with stored message subscriptions to determine required dissemination of the message; generating an alert when an alert condition is satisfied; comparing the alert with stored alert subscriptions to determine required dissemination of the alert; and controlling dissemination of the message and the alert in accordance with their respective required dissemination.

Preferably, the step of comparing the message with stored message subscriptions includes comparing with stored authorization information. The message and alert subscriptions and authorization information are preferably stored in association with message topics. Example alert conditions are identification of a subscription topic match for which the subscriber should be charged or for which auditing is required.

Additional aspects of the invention provide a message broker system and a data processing apparatus for providing a publish/subscribe message dissemination service on behalf of publisher and subscriber programs. The apparatus or system receives a published message from a publisher program and, responsive to identification of one or more subscriber programs subscribing to messages of the type of the received message, forwards the received message to the one or more message subscriber programs. One or more matcher components of the system or apparatus compares the received message with stored message subscriptions to identify the one or more subscriber programs, generates an alert when an alert condition is satisfied, and compares the generated alert with stored alert subscriptions to identify one or more subscriber programs subscribing to the alert. The alert is then forwarded to the subscriber program subscribing to the alert.

U.S. Pat. No. 6,158,007 (referenced above) does not generate alerts but only routes the original message to an audit service, and so there is no disclosure in U.S. Pat. No. 6,158,007 of feeding an alert into a publish/subscribe matching engine to determine its required dissemination.

Additionally, existing data processing systems which generate alerts in response to trigger events typically forward all alerts to a predefined application or person, typically identified by a network address provided to the mechanism which generates the alert, without feeding the alerts into a publish/subscribe matching engine.

The present invention provides great flexibility in relation to onward dissemination and/or processing of alert information, and in preferred embodiments this can be achieved efficiently since all or most of the processing by the publish/subscribe matching engine which determines when to generate an alert is already being performed for publisher/topic and subscriber/topic matching. In preferred embodiments, the same matching engine then performs additional processing to determine what dissemination or additional processing of the alert is required.

Thus, solutions according to the preferred embodiment are able to reuse matching program code for dissemination and processing of alerts and can use an individual execution of that program code both for publish/subscribe matching and alert generation.

Methods according to the invention may be implemented by means of a computer program product comprising program code recorded on a machine-readable recording medium, for controlling the performance of operations of the data processing apparatus on which the program code executes. Such a program product may be a messaging middleware program including a publish/subscribe matching component.

BRIEF DESCRIPTION OF DRAWINGS

Preferred embodiments of the invention are described hereafter, by way of example, with reference to the accompanying drawings in which.

DETAILED DESCRIPTION OF PREFERRED EMBODIMENTS

A first embodiment of the invention provides a mechanism for improved auditing of publications and dissemination of audit information in a publish/subscribe system. The audit information may be used to drive a charging process for accounting for service usage in a publish/subscribe environment or for improved security management.

The publish/subscribe paradigm was described earlier. Before describing embodiments of the present invention in more detail, a brief description of message queuing and message brokers will be helpful.

Messaging and Message Brokers

IBM Corporation's MQSeries and WebSphereMQ family of messaging products are examples of known products which support interoperation between application programs running on different systems in a distributed heterogeneous environment. Message queuing and commercially available message queuing products are described in "Messaging and Queuing Using the MQI", B. Blakeley, H. Harris & R. Lewis, McGraw-Hill, 1994, and in the following publications which are available from IBM Corporation: "An Introduction to Messaging and Queuing" (IBM Document number GC33-0805-00) and "MQSeries—Message Queue Interface Technical Reference" (IBM Document number SC33-0850-01). The network via which the computers communicate using message queuing may be the Internet, an intranet, or any computer network. MQSeries is a trademark of IBM Corporation.

IBM's WebSphere MQ messaging products provide transactional messaging support, synchronising messages within logical units of work in accordance with a messaging protocol which gives assured once and once-only message delivery even in the event of system or communications failures. IBM's WebSphereMQ products provide assured delivery by not finally deleting a message from storage on a sender system until it is confirmed as safely stored by a receiver system, and by use of sophisticated recovery facilities. Prior to commitment of transfer of the message upon confirmation of successful storage, both the deletion of the message from storage at the sender system and insertion into storage at the receiver system are kept 'in doubt' and can be backed out atomically in the event of a failure. This message transmission protocol and the associated transactional concepts and recovery facilities are described in international patent application WO 95/10805 and U.S. Pat. No. 5,465,328.

The message queuing inter-program communication support provided by IBM's WebSphere MQ products enables each application program to send messages to the input queue of any other target application program and each target application can asynchronously take these messages from its input queue for processing. This achieves delivery of messages between application programs which may be spread across a distributed heterogeneous computer network, without requiring a dedicated logical end-to-end connection between the application programs, but there can be great complexity in the map of possible interconnections between the application programs.

This complexity can be greatly simplified by including within the network architecture a communications hub to which other systems connect, instead of having direct connections between all systems. Message brokering capabilities can then be provided at the communications hub to provide intelligent message routing and integration of applications. Message brokering functions typically include the ability to route messages intelligently according to business rules and knowledge of different application programs information requirements, using message 'topic' information contained in message headers, and the ability to transform message formats using knowledge of the message format requirements of target applications or systems to reconcile differences between systems and applications.

Such brokering capabilities are provided, for example, by IBM Corporation's MQSeries Integrator and WebSphere MQ Integrator products, providing intelligent routing and transformation services for messages which are exchanged between application programs using IBM's MQSeries and WebSphere MQ messaging products. Such message broker capabilities could be integrated within other components of a data processing system, such as within the operating system software.

A multi-broker topology may be used to distribute load across processes, machines and geographical locations. When there are a very large number of clients, it can be particularly beneficial to distribute those clients across several brokers to reduce the resource requirements of the brokers, and to reduce the impact of a particular server failing. The scalability and failure tolerance of such multi-broker solutions enable messages to be delivered with acceptable performance when there is a high message throughput or a broker fails. When clients are geographically separated, it can be beneficial to have brokers located local to groups of clients so that the links between the geographical locations are consolidated, and for well designed topic trees (see below) this can result in many messages not having to be sent to remote locations.

Figure 1:
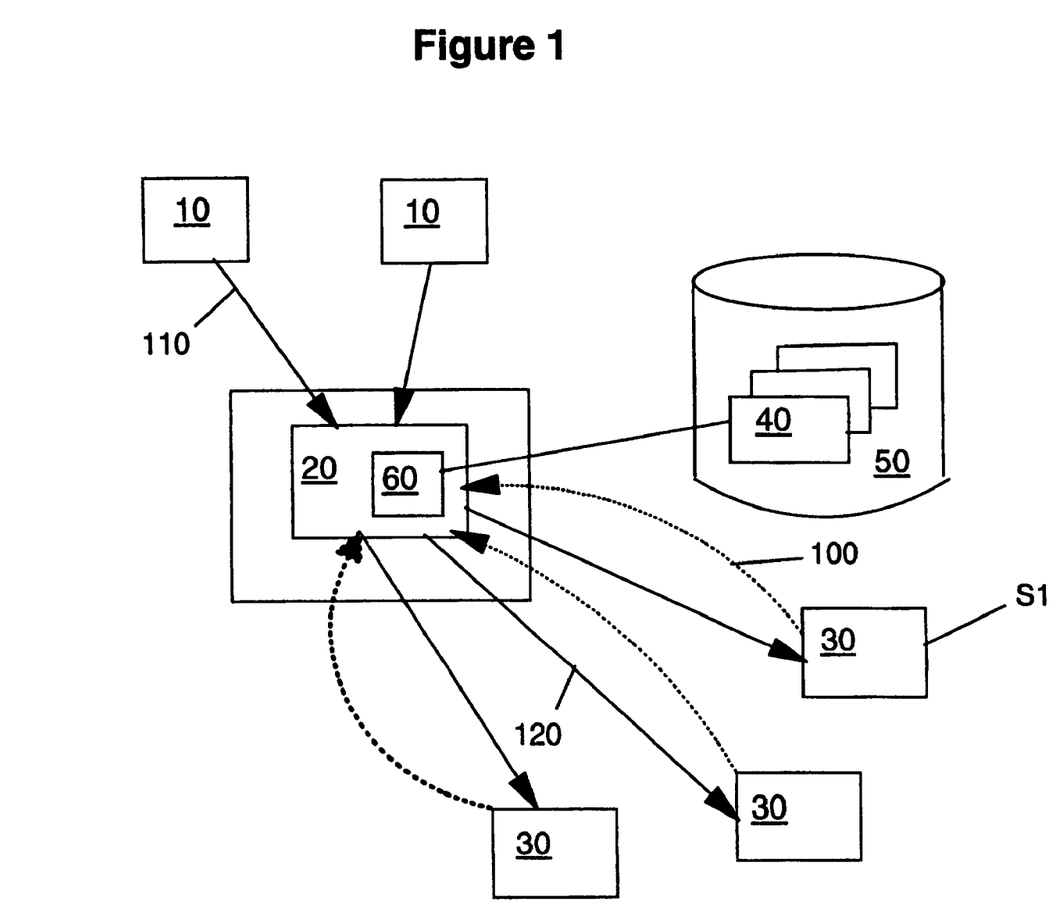
FIG. 1 is a schematic representation of a messaging network in which publisher and subscriber applications communicate via a message broker, and in which the present invention may be implemented.

FIG. 1 shows an example message broker network in which one or many publisher applications 10 are sending 110 messages to a first message broker 20. The first message broker may have one or many subscriber applications 30 which have registered 100 their interest in receiving specified message types from the publishers. In a typical publish/subscribe message broker environment, the publisher does not explicitly identify target subscribers and may not know or care who the subscribers are. Publisher and subscriber applications do not have a dedicated end-to-end connection, and may not even be concurrently connected to the broker network.

Instead, publishers typically specify 110 topic names for the messages they are publishing, and subscribers specify 100 topic names for the messages they are interested in receiving. The message broker includes a matching engine 60 for comparing an incoming message with the subscription profiles 40 of the various subscribers to identify matches, and the broker passes matching messages to an output component for forwarding to the relevant subscribers. For example, a subscriber S1 may be interested in receiving all messages related to the IBM stock price and may send a subscription request to the broker such as "Stock/IBM". The broker stores this subscription information. Then if a message arrives at the broker from a publisher and the message header includes topic identifiers "Stock/IBM" the broker will compare this message with its subscription lists, identify that the message matches the subscription profile for subscriber S1 and route the message to S1.

Other message broker solutions enable content-based routing of messages (i.e. the analysis of a message by the broker is not limited to the topic information in message headers). For a topic such as "Stock/IBM", a content filter "Body. price>100" could also be used to only identify a match for published messages in which the stock price exceeds the specified value. Stock price examples will be referred to again later in the context of example applications of alerts.

Typical message broker solutions use a single transport mechanism for all messages. For example, a message broker may be configured to always send messages with transactional assured delivery under the control of IBM Corporation's WebSphere MQ message delivery software. However, the use of different communication protocols for different message types has recently been proposed.

Figure 2:
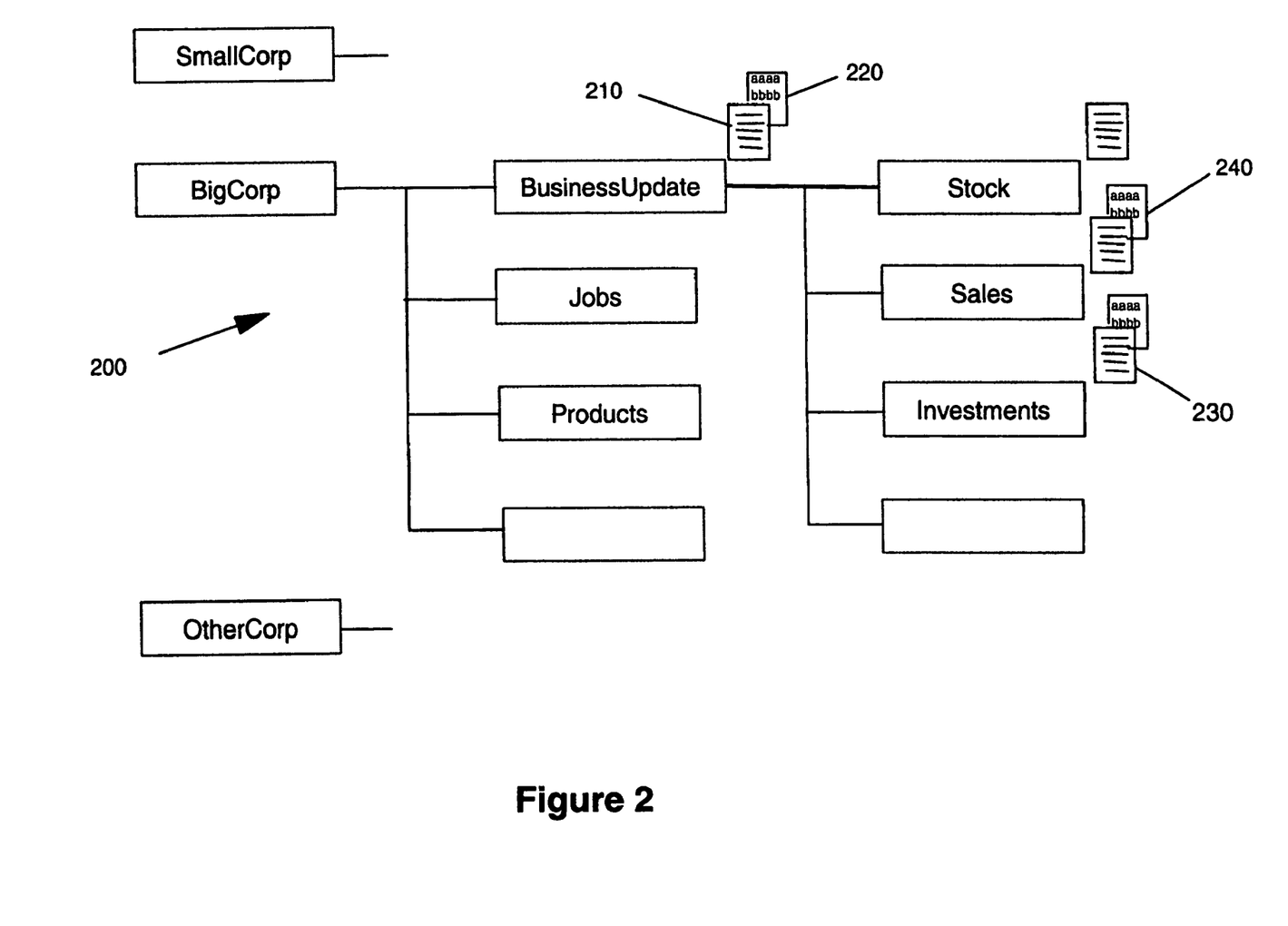
FIG. 2 shows an example topic tree for use as a searchable index within the message broker, with associated stored objects represented schematically.

Referring to FIG. 1, publishers 10 create messages containing a topic name. The published messages are delivered 110 to a connected message broker 20. Subscribers 30 create subscriptions 40 containing a topic attribute and, optionally, a content filter for that topic. These subscriptions are registered 100 with the message broker, which stores them in a table format in a repository 50. Efficient access to relevant subscription information and other data within the tables is enabled by storing the data in a 'match space' storage area of the repository in association with topic names, and organizing the topic names in a tree structure. The topic tree is a form of searchable index for identifying relevant data objects in the repository, and its organization reflects the normal ordering of topic names within topic strings of published messages and received subscriptions. An example topic tree is shown in FIG. 2.

The tables may include filters for any number of the topics of interest for any of the subscribers 30 that connect to the broker network via connections to that broker 20. A single subscriber 30 may register multiple subscriptions 40 with different filters for different topics.

Figure 3A:
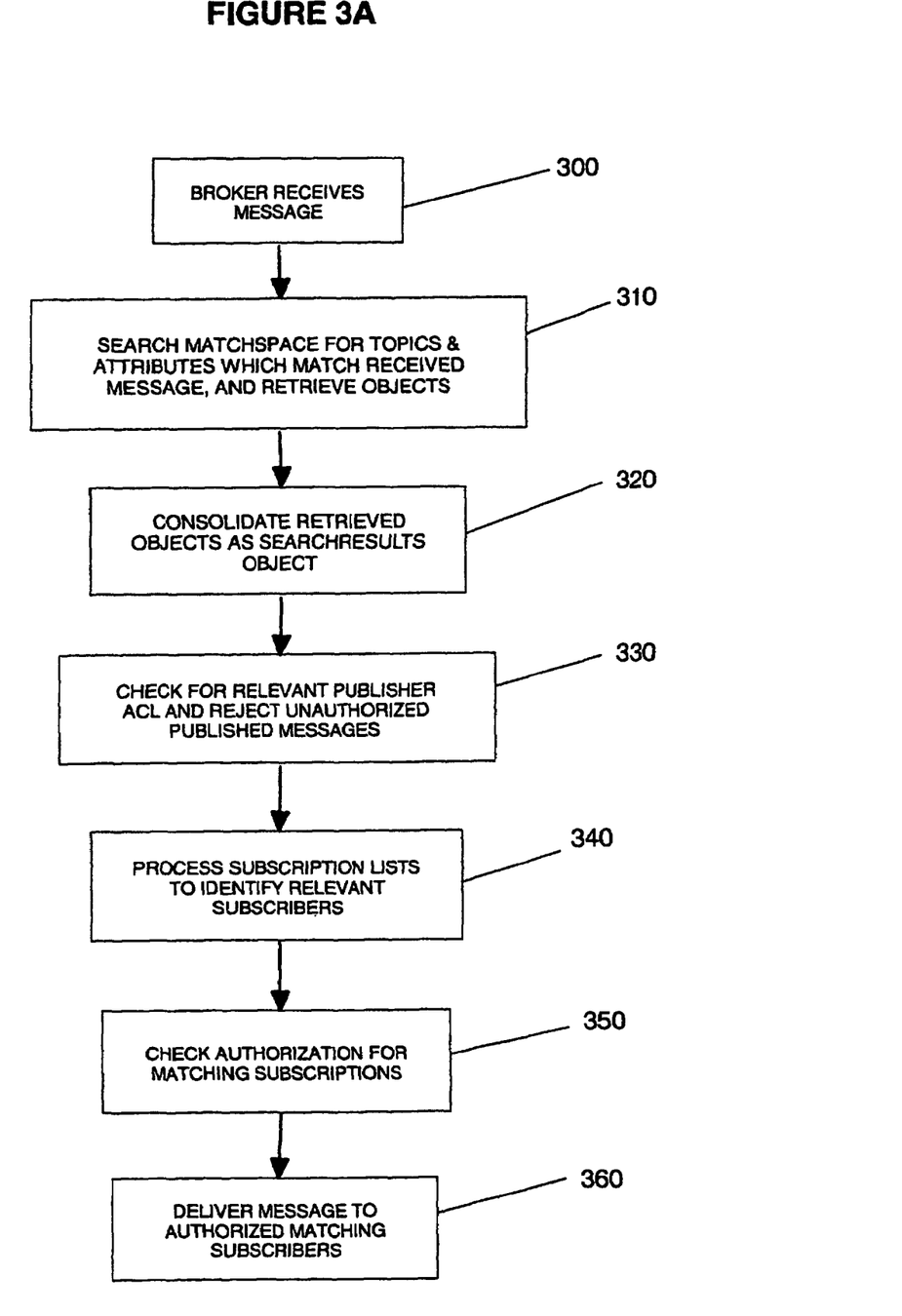
FIG. 3A is a schematic flow diagram showing a sequence of steps of a method of processing a received message.

Described below with reference to FIG. 3A is a sequence of steps performed by a message broker when processing received messages.

When the message broker 20 receives 300 a published message, a first step performed by the broker is to search 310 the match space of the repository 50 to identify stored topics and other attributes or objects which match the message information, and to retrieve the relevant information and objects. The topic name within the published message is a key parameter for this search and retrieval. The traversal may involve a full traversal of the repository 'match space' in which subscriptions (and other information such as authorization information) are stored as objects.

An efficient mechanism for storing authorization information is to store access control lists (ACLs) in association with the topics in the topic tree mentioned earlier.

FIG. 2 shows a simple example of a topic hierarchy for published messages and subscriptions. Some of the topics have subscription list objects (210, 230) and ACL objects (220, 240) stored against them. Let us assume that a message with topic string 'BigCorp/BusinessUpdate/Sales' is received by the broker. The scanning of the repository's match space is performed iteratively using the components of the topic string and the stored topic tree. Firstly, the topic component 'BigCorp' is used to identify a relevant topic hierarchy 200 within the match space; then the 'BusinessUpdate' component is compared with the topic tree to identify stored objects including subscription lists 210 and ACL objects 220 (and potentially other stored objects); and then the 'Sales' component of the received topic string is used to identify further subscription list objects 230 and ACL objects 240.

All of the relevant information identified in this search is then consolidated 320 and the accumulated ACLs are combined, with allowance for ACL inheritance, and the result of this processing is output as a SearchResults object for further processing.

A next step is to process the SearchResults object to check 330 whether the SearchResults object contains a publisher ACL object for the topic of the received message. This determines whether the publisher is authorized to publish messages on the specific topic. For example, a message broker may be set up to ensure that certain topics of information are only accepted from specific approved sources (such as a news service trusted for accurate and politically-unbiased reporting, or a source of photographic images known for high quality and originality). Any attempt by an unauthorized party to publish information on that topic will be blocked—the broker will reject the message.

A next step performed by the broker is to process the subscription lists within the SearchResults object to identify the set of subscribers relevant to the topic string of the received message. As noted earlier, subscriptions may contain a filtering expression on elements of the message body and the matching component 60 applies these filters to identify matches when the filter as well as the topic name is satisfied.

For each subscriber 30 having a registered subscription 40 which matches the message, the message broker 20 also checks 350 an administrator-defined authorization policy for the message topic and the subscriber which registered the subscription.

Since the ACLs are stored in association with topics in the same way as subscription lists, the checking of authorizations can be performed by comparing topic and subscriber names with the consolidated ACLs within the SearchResults object—similarly to comparing topics with embedded subscription list objects. The set of matching subscriptions are also processed to remove duplicates. The original scan of the subscriber match space retrieved all of the information required to check subscription lists and ACLs.

An identified match between a subscriber and the topic of a received message will not result in the message being forwarded to that subscriber if blocked by an ACL. However, subject to the authorization check, the message broker then delivers 360 the message to each matching subscriber which satisfies the authorization check.

A specific example will now be described with reference to the topic tree 400 of FIG. 4. The annotations of the form [Sa] indicate that subscriber a has subscribed to that part of the tree. The annotations of the form (b) indicate that the access control list for the current topic (and for the underlying topics in that part of the tree in the absence of conflicting underlying ACLs—in view of ACL inheritance) comprises subscriber b.

Assume the following subscriptions have been received by the broker:
[Sa]: BigCorp/*
[Sb]: BigCorp/stock/*
[Sc]: BigCorp/announcement/*
[Sd]: BigCorp/stock/sell/*

Assume the following subscriber access controls have been defined:
{a}: *
{a}: ! BigCorp/stock (! used to indicate NOT)
{b}: BigCorp/*
{c}: *

Assume that the default in the absence of any security information (no access control list entry) is that the subscriber will not receive the message.

Figure 4:
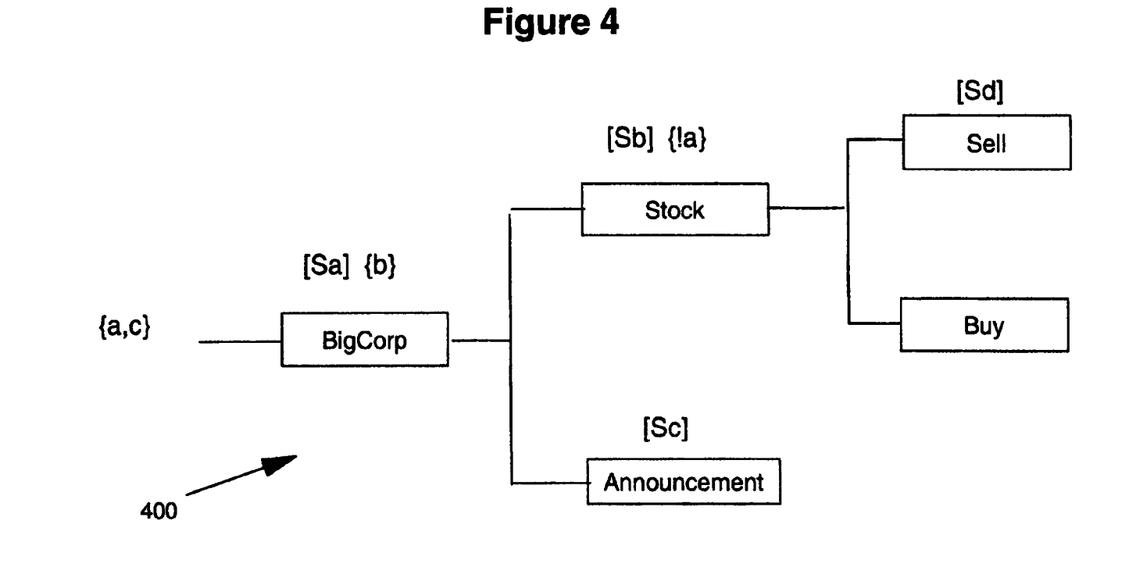
FIG. 4 shows a second example topic tree and example stored subscriptions and subscriber access controls.

This information is used to build the topic tree shown in FIG. 4. Greater complexity is typical if subscriptions with leading or embedded wildcards are allowed (such as */stock/sell/*) but since the solution to such complexities is known in the art it is not necessary to describe the solution in detail here.

When a message is received at the broker with topic string BigCorp/stock/sell/500, the matching component iteratively searches the topic tree taking each of the components of the topic string in turn. In a single pass of the tree, the matching component retrieves the following annotations: {a,c} [Sa] {b} [Sb] {!a} [Sd]. These annotations are then sorted by types and merged to generate consolidated lists of relevant subscriptions and authorized subscribers: [Sa, Sb, Sd] and {b, c}.

The broker now knows that Sa, Sb and Sd wish to receive the message and that subscribers b and c are permitted to receive the message. The message is therefore sent to subscriber b only. Since the default is that subscribers are not permitted, the lack of security information for d means that d does not receive the message.

A significant enhancement to the above-described authorization checking for publish/subscribe systems is to generate alerts upon occurrence of security-notifiable events, chargeable events, or other predefined trigger events. A first example of such events would be the failure of a security check—i.e. an attempt to perform an action blocked by an ACL—as shown in the flow diagram of FIG. 3B.

Figure 3B:
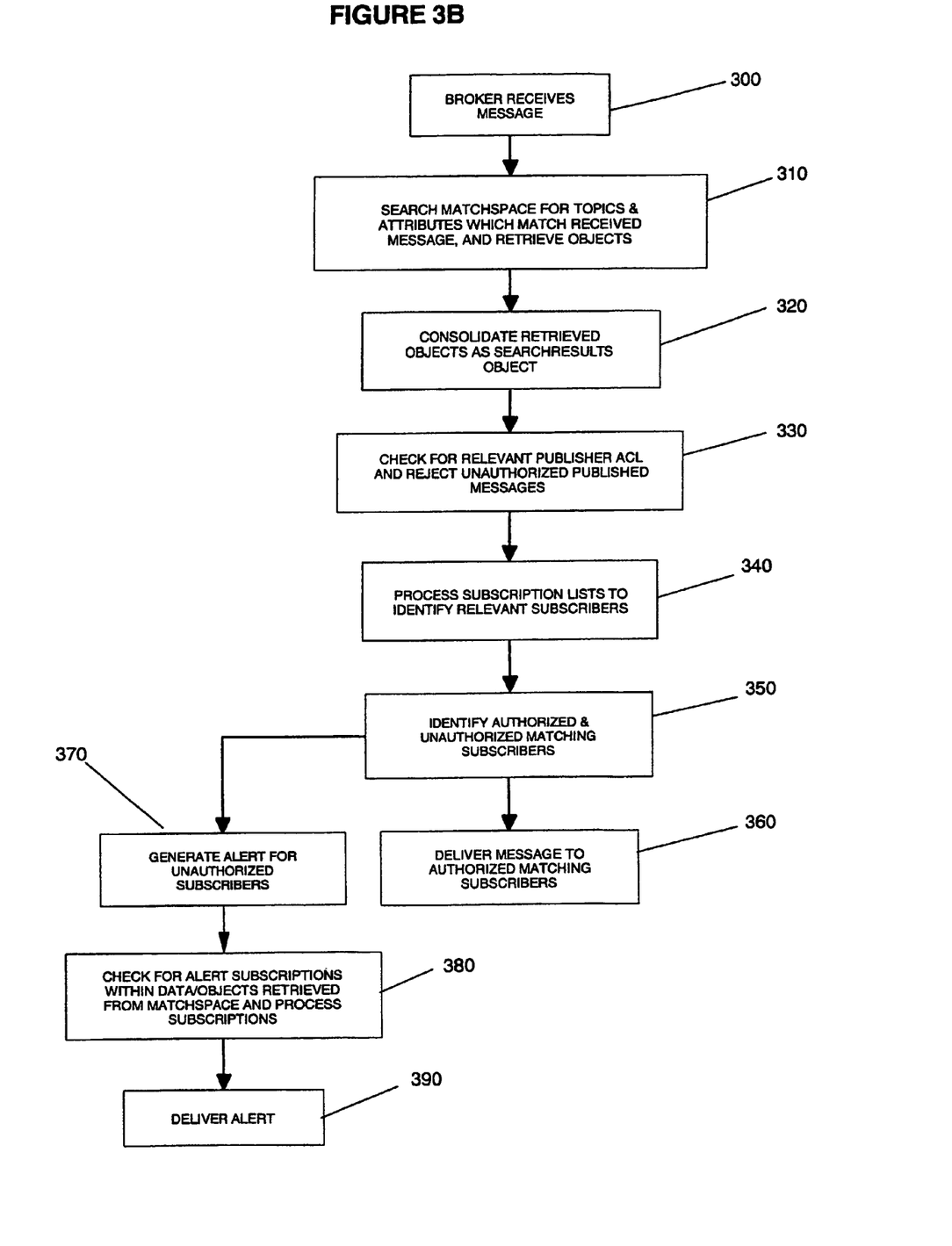
FIG. 3B shows the method steps of FIG. 3A and additional steps of generating and processing alerts using subscription matching, according to an embodiment of the invention.

Since the ACLs for subscribers are stored in the repository 50 in association with topic names within subscriptions 40, the execution of the matching component 60 which evaluates which subscribers are authorized to receive messages on a particular topic can also provide the trigger for generating an alert 370. Therefore, not only is the same matching component 60 used to perform subscription matching 340, authorization checking 350 and alert generation 370, but the very same execution of that matching component can be used in the performance of all these functions.

Figure 5:
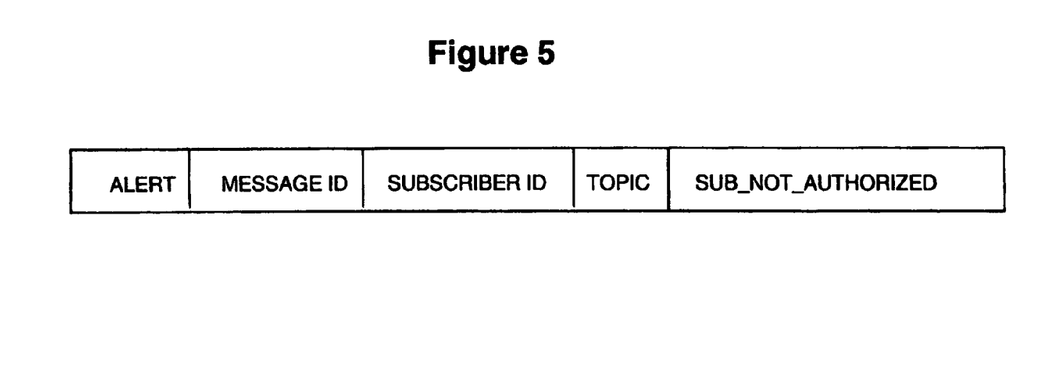
FIG. 5 shows the fields of an example alert message generated within a message broker according to an embodiment of the invention.

An alert according to this embodiment of the invention comprises an identification of the original message which resulted in rejection of the publication or subscription step due to the authorization check, identification of the publisher or subscriber relevant to the rejection, identification of the topic if relevant to the rejection, and an identification of why the rejection occurred. The fields within an example alert are shown in FIG. 5.

Unlike typical known alert or alarm systems, alerts generated by the broker are not merely the original message being routed to a predefined single administrator or application. Instead, the alerts themselves are directed to the matching component within the broker for the matching component to determine 380 which applications should receive the alerts. Step 380 could include a separate matchspace search to identify alert subscriptions, but in preferred embodiments a single scan of one broker system's matchspace can retrieve all objects required for subscription matching, authorix\zation checking and for identifying relevant subscriptions for alerts.

This allows a security application to be registered with the broker as a subscriber for alerts. Potentially the same broker and even the same matching component 60 can be used for determining the required dissemination of an alert as was used for generating the alert in response to the identification of a rejected authorization check.

The generation of alerts, instead of merely adding extra subscriptions to the original message topics, is particularly advantageous. Firstly, merely adding subscriptions suffers from the problem of whether to conform to the principle that normal subscribers do not receive any indication of which other subscribers received or did not receive a particular message. Registering an audit application as an additional normal subscriber to the original message topic will provide only a very limited audit capability—unless additional capabilities are added and the above principle is discarded. The present invention provides much greater flexibility for audit, subscription charging, and reporting alert conditions, as discussed below (and subsequently in relation to parameterized rules).

Once generated, in response to the authorization rejection, a new alert is passed to an input node of the message broker which identified the authorization rejection. The processing of the alert to determine which applications should receive it can be asynchronous from the previous authorization check, but similar attribute-based subscription matching is performed 380. In this case, the relevant attribute is a type label of "alert" which the message broker retrieves from the alert when retrieving it from the broker's input node. This type label is then used to access the relevant table of subscriptions to identify subscribers for alerts for this topic or subscribers for all messages of type "alert".

In alternative implementations in which different types of alert have different subscribers, the type label is sufficiently specific to be associated with a specific reason for the alert (alert1, alert2, alert3). For example, authorization-based rejection is only one of many potential causes of alert generation. Still in a security context, alerts may be useful whenever sensitive message types are delivered successfully (as well as when rejected). Alerts may be required for general audit purposes, or for usage-based charging when specific types or topics of messages are delivered or when messages are delivered from specific publishers who charge for their messages.

An example implementation of alerts will now be described with reference to FIG. 6. Referring to the example of FIG. 4, a rule #ref:S?# is added which triggers generation of an alert to indicate when a request is rejected because of an ACL (either an explicit rejection instruction in the ACL, or absence of a positive permission). The specific rule procedure in which this rule is coded is implemented using Prolog or another rule based language. The alert procedure is given the following data as input parameters:

(a) the [ . . . ] subscription list;
(b) the { . . . } ACL list; and
(c) an identification of the interested subscriber for alerts.

The alert procedure then sends information to the subscriber-for-alerts regarding the difference between the subscription list and the ACL—for example, denied subscribers. The interested subscriber-for-alerts will typically not be the denied subscriber but a system administrator responsible for authorization controls, or an audit program.

However, in certain circumstances it may be desirable to alert individual subscribers to the fact that they are being denied access to messages that they wish to receive. For example, the rejection could be because the subscribing individual has failed to renew their subscription renewal fees, and the alert will provide an automatic reminder.

Let us assume that Audit subscriber Sx wants to know about rejected stock requests, but does not care about rejected announcement requests. Sx registers as a subscriber of the message broker with an associated alert generation rule such as:

rej:Sx#:BigCorp/stock

Figure 6:
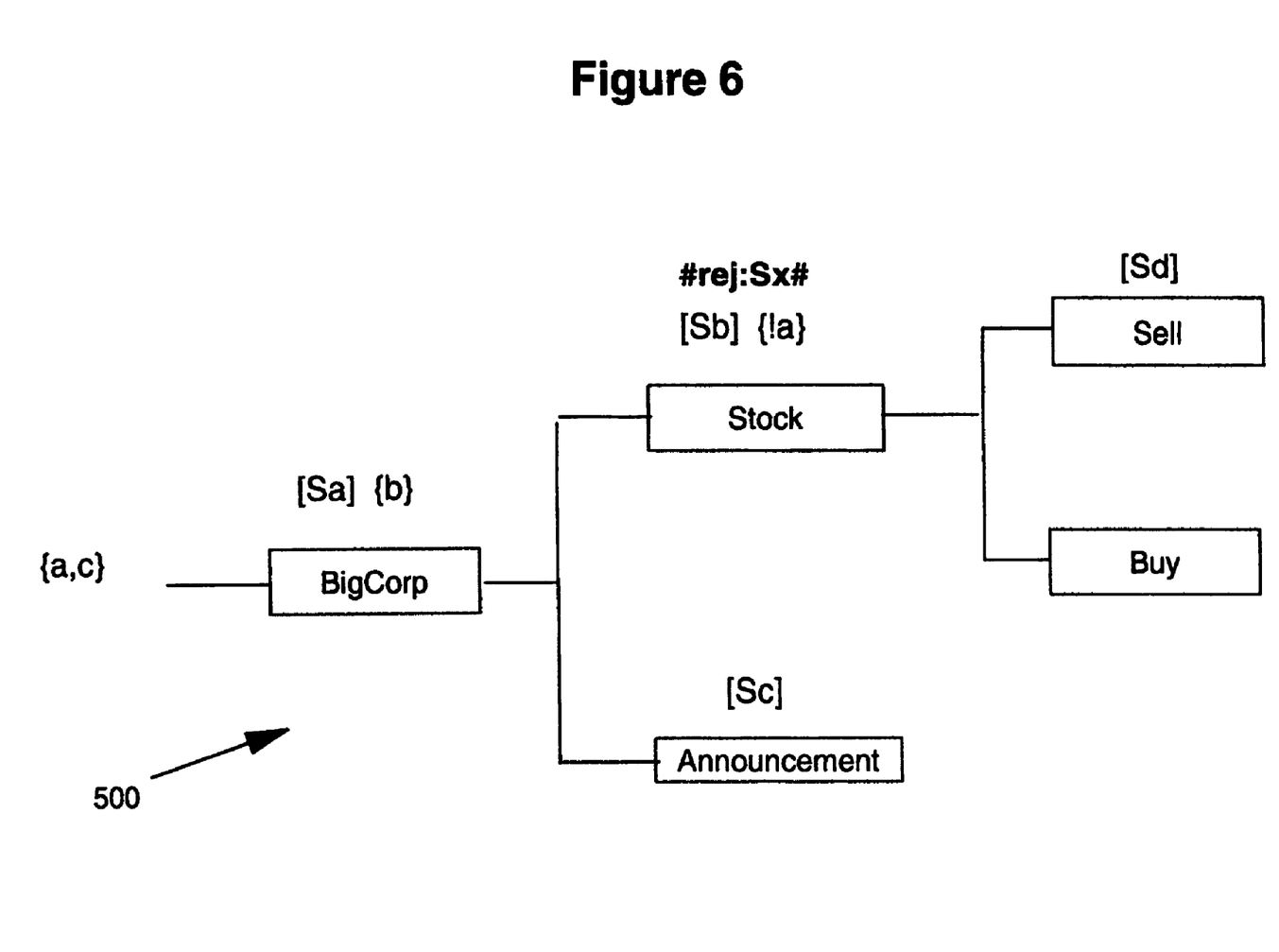
FIG. 6 shows the topic tree of FIG. 4 including a stored rule for generating an alert in response to an ACL rejection, according to an embodiment of the invention.

A topic tree is generated such as shown in FIG. 6. A single scan of this topic tree to collect annotations will retrieve the following:

{a,c} [sa] {b} [Sb] {!a} #rej:Sx# [Sd]

The matching component of the message broker then sorts these into annotation types and merges them to generates the lists [Sa, Sb, Sd] and {b,c} and #rej:Sx# As before, the message is sent to b only.

However, the alert procedure for rule instance #rej:Sx# is also invoked, and Sx is notified of the exceptions [Sa, Sd].

Figure 7:
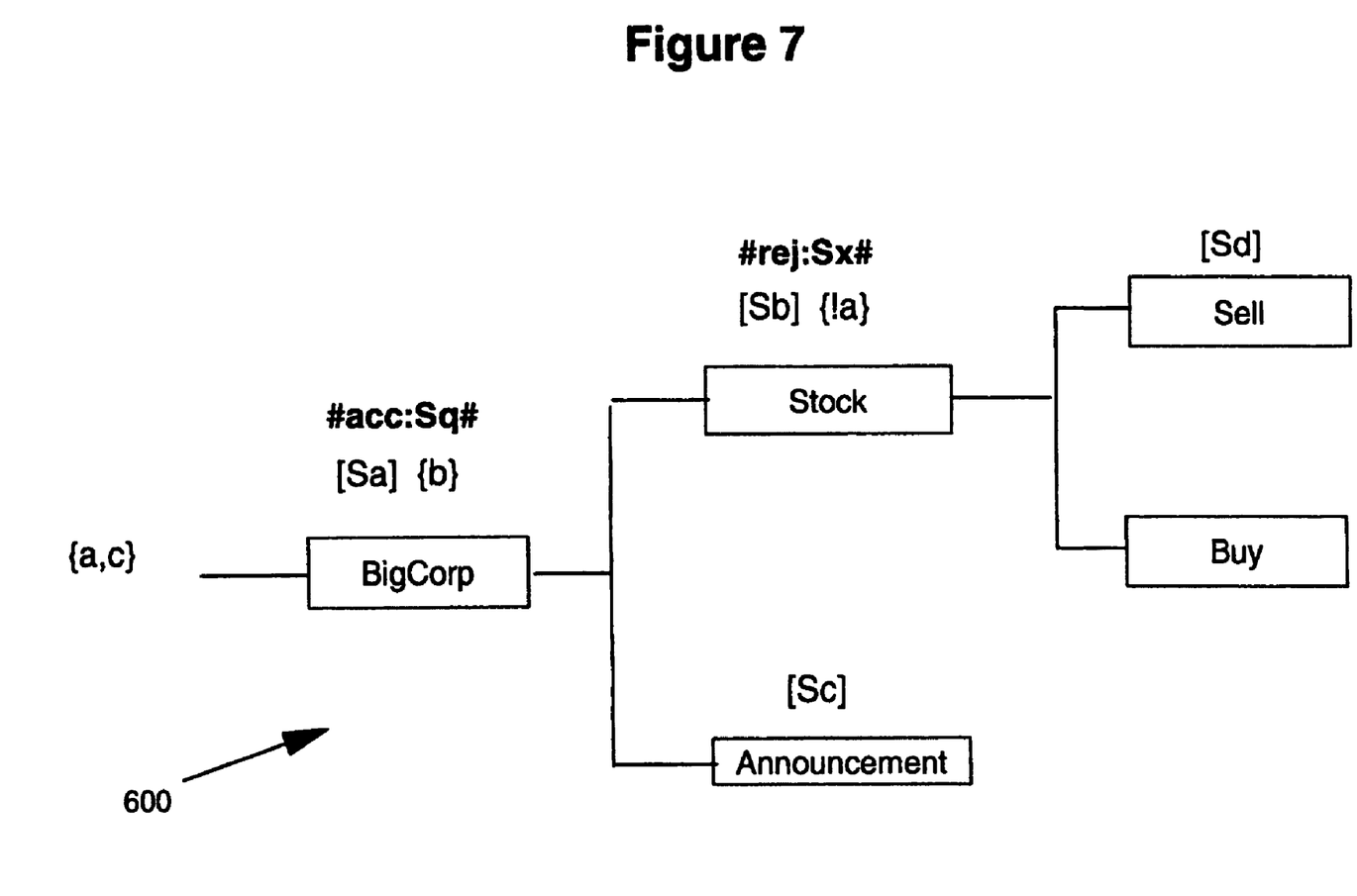
FIG. 7 shows the topic tree of FIG. 6 including a stored rule for generating alerts for sent messages, according to an embodiment of the invention.

A second example implementation relates to a charging application—where subscribers are to be charged for messages sent to them on topic BigCorp. A different alert procedure #acc:S?# is written, implementing a rule for reporting on messages actually sent to subscribers. The charging application Sq registers as a subscriber to the message broker for receiving alerts in accordance with the rule #acc:Sq#: BigCorp/*

The new generated tree 600 is shown in FIG. 7.

A single pass down the tree retrieves annotations {a,c} [Sa] {b} #acc:Sq# [Sb] {!a} #rej:Sx# [Sd]. The matching component sorts these into annotation types and merges them to generates the lists [Sa, Sb, Sd] and {b,c} and #acc:Sq# #rej:Sx#.

Sq is now informed by rule #acc:Sq# that [Sb] received the message.

In addition to subscriptions and ACL objects used for determining required dissemination, rules procedures are also presented with other information collected during the execution of the matching engine if the information is relevant to the particular rule. The information is stored in the broker's matchspace in association with nodes of a topic tree and is presented to appropriate rules procedures as parameters to the procedures. The list of subscribers and ACLs may be required parameters for an audit procedure, such that the audit procedure can use the subscriptions and ACLs both to determine required dissemination/processing of an alert and can use these parameters to add information to the alert which it sends to an interested subscriber-for-alerts.

Thus, according to an alternative embodiment of the invention, each subscription can be annotated with information to be sent with an alert. For example, assume a subscription as follows:

[Schecker]: BigCorp/stock/*->'rejected'+inmsg+{ }+[ ]

An authorised match on a conventional subscription will result in the original message being passed to the subscriber. A parameterised subscription according to this embodiment will result in additional information also being passed to the subscriber. In this example, the subscriber [Schecker] will be sent the incoming message, together with the fact that it is a 'rejected' message, and the { } list of requestors, and the [ ] ACL list. The basic match processing is unchanged from the embodiment described previously. In the previously described embodiment, the matching rule is executed at the matching engine at the time of the match. In the 'parameterised subscription' implementation, a message is sent with the appropriate extra information, and the 'subscriber' to this extended message processes the rule asynchronously.

Nodes of the tree 600 can be annotated with values or prices as well as other parameters. As a result of a matchspace search, a value list is retrieved which indicates values of documents (based on topic or content). A rule implemented within the alert-processing broker determines which of the values in the retrieved value list is to be applied (for example the highest value, the sum of the values, or the last encountered). The value to be applied is fed as an additional parameter to any rule procedure which requires this as a parameter.

The above description of use of parameters is an additional advantage over solutions which merely add a conventional subscription to the matchspace for an audit program. A conventional subscriber would receive an original message as received by the broker, but would not receive other associated information stored as annotations of the topic tree. Therefore, solutions which add an audit service as a conventional subscriber do not provide the capabilities of the parameterized rule indication of the preferred embodiment of the present invention.

Since a single pass of the topic tree can be used to retrieve all of the data relevant to subscription matching and alert generation, determining which rules to process and which parameters to use, the present invention can be implemented very efficiently as an enhancement to existing message broker software. The task of scanning the topic tree is a task that would already be required in conventional subscription matching. This scanning operation is often the most costly step in terms of processing time within a typical message broker, and so the generation of alerts according to the present invention can be implemented very efficiently.

The processing of rules for determining appropriate dissemination of alerts is additional processing which is not performed by conventional message brokers, and the forwarding of the alerts and subsequent processing for audit or charging are also additional tasks for the broker and audit or charging applications. Nevertheless, these additional overheads are acceptable for the improved auditing, reporting and charging solutions that they enable.

Rules procedures may be predefined for the message broker system but, in preferred embodiments of the invention, the broker software is adapted to facilitate addition of further rules procedures as required. The above-described solution for the collection of rules to be executed for a given incoming publication is applicable to such additional rules which are stored in association with nodes of the topic tree in the matchspace.

A specific implementation of the above described solution involves extending the existing authorization features of a publish/subscribe message broker program—extending an administration GUI and an administration scripting interface to allow specifying of when alerts are to be generated, and what form they should take. For example, an alert may include an identification of the original message, identification of the publisher or subscriber involved and the topic if relevant, the reason for the alert generation, and whether or not a security system permitted the requested action. This has a lower communication overhead than routing the original message to an audit service since the information required for audit purposes could be much smaller than the content of the original message. An alternative implementation adds the new rules or extended subscriptions into the broker system (and stores them in association with nodes of the matching tree) by an extension of the conventional subscription mechanism.

In one alternative embodiment of the invention, the information which is output by a rules procedure can include the original received message—if this is determined to be appropriate by the specific rules procedure. This can be appropriate for some applications such as audit applications and security applications. However, in view of the increased communication overhead if the original message is included within an alert, this is generally not appropriate for a charging application. For charging algorithms, all that is generally required is a confirmation that the chargeable message was sent and any required message value information. In a parameterised subscriptions solution, the parameterization of the subscription will determine which details are sent to the subscriber.

In a multi-broker publish/subscribe system—which may be distributed across a network of computers—the distribution of rules (or parameterised subscriptions) operates in a similar way to the distribution of conventional subscriptions. Parameterised subscriptions have increased opportunities for permitting the program code implementing rules for processing alerts to be located remotely from the matching code that recognised their relevance. It is also possible for the subscriber to a parameterised subscription to be a publish/subscribe matching engine. The parameterised subscription message resulting from the originating publication message is treated in turn as a publication by the second publish/subscribe broker. In one example implementation, an audit service is running on a separate broker from the broker which first receives a published message. The first broker generates alerts (a small additional overhead) and sends the alerts to a second broker which processes the alerts and routes them to a subscriber application such as a security application, an accounting/charging application, or a general audit application.

In a further example application of the invention, an SMS messaging application or equivalent 'pager' application is used to transmit alerts to warn subscribers that an important new message is awaiting action. This is an example of alerts being generated and used to warn subscribers that high priority messages have arrived. An administrator or subscriber specifies to an alert service which message topics or priority levels they wish to receive alerts on, a broker sends messages to subscribers and additionally sends alerts to the alert service broker which applies its own subscription/topic matching.

As indicated in the example of the last paragraph, alerts may be sent using a different communication protocol or different quality of service from normal messages. For example, duplicates may not be a problem for some alerts (perhaps the alert must be received immediately or is of no value) whereas in an audit trail solution the speed of delivery may be of little importance but assured once-only delivery may be a requirement. The choice of communication protocol may be made by the implementation of the rules procedure when the alert is controlled by a rule invoked locally to the matching engine. Alternatively, in a parameterised subscriptions solution, the topic tree can be annotated with protocol details and the appropriate communication protocol is an input to the rules procedure. This capability can be implemented as a relatively simple extension to certain existing systems in which there is already an ability to choose distribution details (protocol or persistence) in association with ordinary subscriptions.

The invention claimed is:

1. A data processing apparatus for providing a publish/subscribe message dissemination service on behalf of publisher and subscriber programs comprising:
   means for receiving a published message from a publisher program;
   means, responsive to identification of one or more message subscriber programs subscribing to messages of the type of the received message, for forwarding the received message to the one or more message subscriber programs; and
   one or more matcher components for:
   comparing the received message with stored message subscriptions to identify the one or more message subscriber programs;
   generating an alert when an alert condition is satisfied; and
   comparing the generated alert with stored alert subscriptions to identify one or more subscriber programs subscribing to the alert; and
   means for forwarding the alert to the one or more subscriber programs subscribing to the alert, wherein
   the message and alert subscriptions are stored in data storage in association with message topic information, the one or more matcher components including means for retrieving stored subscription information by reference to message topic information of a received message,
rules procedures for generating and determining required dissemination of alerts are stored in association with the message topic information, wherein the one or more matcher components are adapted to identify a relevant rules procedure by reference to the message topic information and to forward to the identified rules procedure:
a message subscription list;
a list of authorized recipients; and
an identification of one or more subscribers for alerts; thereby to enable generation and determination of required dissemination of an
alert;
the one or more matcher components includes:
  means for performing an authorization check to identify a subset of the identified one or more message subscriber programs which subset of programs is authorized to receive the message; and
  means for generating an alert when the authorization check identifies an unauthorized message subscriber.

* * * * *